No. 676,347. Patented June 11, 1901.
J. W. WEAVER.
MEAT CHOPPER.
(Application filed Feb. 21, 1901.)
(No Model.)

Witnesses
Franck L. Ourand.
W. Parker Reindel.

Inventor
Joseph W. Weaver.
By D. C. Reindel.
Attorney

UNITED STATES PATENT OFFICE.

JOSEPH W. WEAVER, OF LEBANON, PENNSYLVANIA, ASSIGNOR OF ONE-HALF TO JACOB M. REBER, OF SAME PLACE.

MEAT-CHOPPER.

SPECIFICATION forming part of Letters Patent No. 676,347, dated June 11, 1901.

Application filed February 21, 1901. Serial No. 48,213. (No model.)

*To all whom it may concern:*

Be it known that I, JOSEPH W. WEAVER, a citizen of the United States, residing at Lebanon, in the county of Lebanon and State of Pennsylvania, have invented certain new and useful Improvements in Power Meat-Choppers; and I do hereby declare the following to be a full, clear, and exact description of the invention, such as will enable others skilled in the art to which it appertains to make and use the same.

My invention relates to meat-choppers, has especial reference to that class of meat-choppers driven by power and used to chop large quantities of meat, has for its object the neutralizing of the end thrust of the shaft as far as possible, and consists in certain improvements in construction, which will be fully disclosed in the following specification and claims.

Figure 1:
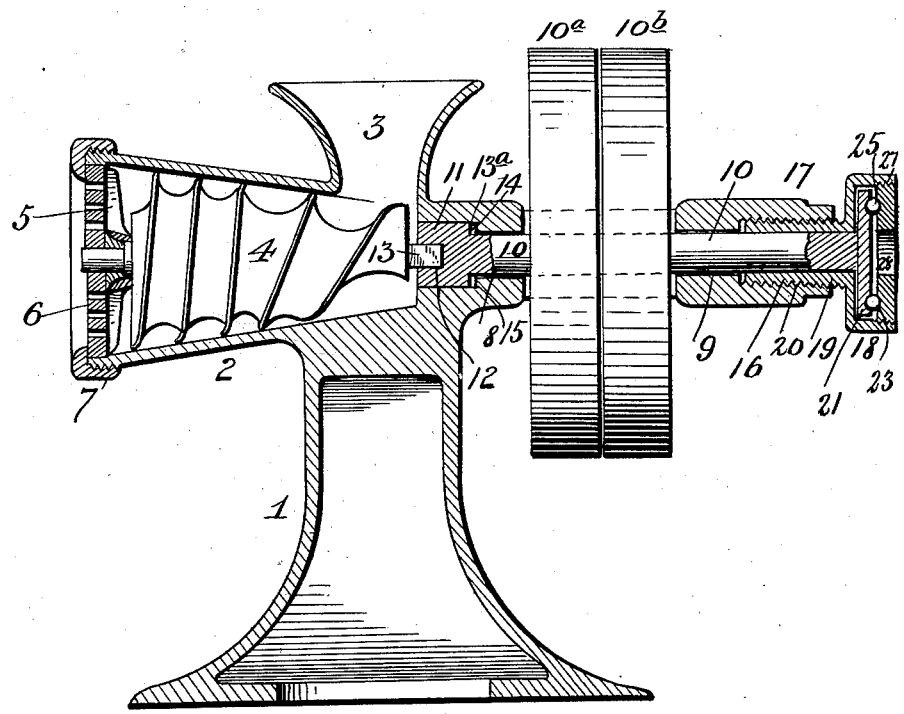
Figure 2:
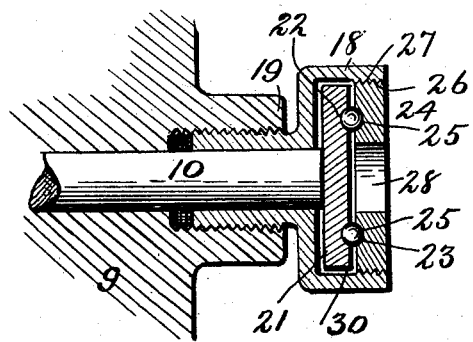

In the accompanying drawings, which form part of this specification, Figure 1 represents a vertical longitudinal section, partly in side elevation, of one type of meat-choppers provided with my invention; and Fig. 2, a like view, on an enlarged scale, showing the end of the frame to which the ball-bearing is attached.

Reference being had to the drawings and the numerals thereon, 1 indicates the frame of a meat-chopper, 2 the casing, 3 the hopper, 4 the feed-screw, 5 the knife, 6 the perforated plate at the outer end of the casing, and 7 the retaining-ring, all of which may be of any preferred form of construction.

The frame 1 is provided with an inner shaft-journal bearing 8 and an outer like bearing 9, in which the shaft 10, with its pulleys $10^a$ $10^b$, is supported, and the shaft is provided at its inner end with a shoulder or head 11, having a socket 12 to receive the pin 13 on the feed-screw, and the shoulder fills the enlarged bearing $13^a$ with its outer end 14 just free from the seat 15.

The outer end of the bearing 9 is enlarged at 16 and is internally screw-threaded, as shown at 17, to receive the thrust-bearing, which consists of a casing 18, having a neck 19, externally screw-threaded at 20, and engages the screw-thread 17 to connect the thrust-bearing with the frame of the machine and become a part thereof. Within the casing 18 is a disk 21 of less diameter than the interior of the casing to form an oil-chamber 30 to lubricate the thrust-bearing, and said disk is provided with an annular groove 22, which, in conjunction with the annular groove 23 in the disk 24, retains the balls 25 in their proper position. The disk 21 is free to revolve, and the outer end of the shaft 10 bears against the outer surface of said disk, while the disk 24 is externally screw-threaded at 26 and is fixed in the outer end of the casing 18 by connection with the internal screw-threads 27. As thus constructed the thrust of the shaft 10 is transmitted to the revoluble disk 21, the balls 25, and the fixed disk 24, and the oil for the chamber 30 is supplied through the opening 28 in disk 24 and is maintained above the balls 25 and the grooves in the disks 21 and 24.

The bearings 5 and 6 are provided with suitable means for lubricating the same. (Not shown, as their construction is well known.)

Having thus fully described my invention, what I claim is—

1. In a power meat-chopper, a frame having shaft-bearings; in combination with an antifriction thrust-bearing having a casing provided with a neck engaging one of the bearings on the frame, an oil-chamber within said casing, a member forming one of the parts of the thrust-bearing and fixed in the outer end of said casing, a shaft engaging said thrust-bearing, and a cutter driven by said shaft.

2. In a power meat-chopper, a frame having a shaft-bearing adjacent to the casing thereof, a like bearing at the outer end of the frame enlarged at its outer end and internally screw-threaded, a cutter, and a shaft connected to said cutter; in combination with an antifriction thrust-bearing having a casing provided with an externally-screw-threaded neck engaging said frame, an oil-chamber within said casing, a revoluble disk in and of less diameter than said chamber and provided with an annular groove, a fixed disk at the end of the casing having a like groove and balls in said grooves.

3. In a power meat-chopper, a frame having shaft-bearings; in combination with an antifriction thrust-bearing having a casing provided with a neck engaging one of the bearings on the frame, an oil-chamber within said casing, a member forming one of the parts of the thrust-bearing and fixed in the outer end of said casing, a revoluble member, a shaft extending through the neck of the casing, and engaging the thrust-bearing, and a cutter driven by said shaft.

4. In a power meat-chopper, a frame having a shaft-bearing adjacent to the casing of the chopper and a like bearing at the outer end of the frame; in combination with a shaft having a head at one end and supported in the bearing adjacent to the casing, a thrust-bearing having a neck and connected to the outer end of the outer bearing for the shaft, a shaft supported in said bearings and in the neck of the casing, and a cutter connected to the head of the shaft.

In testimony whereof I affix my signature in presence of two witnesses.

JOSEPH W. WEAVER.

Witnesses:
R. R. UHLER,
DANIEL E. GORMAN.